US012668681B2

(12) United States Patent
Wang et al.

(10) Patent No.: US 12,668,681 B2
(45) Date of Patent: Jun. 30, 2026

(54) NANOCOMPOSITE FLAME RETARDANT, FLAME RETARDANT BISMALEIMIDE RESIN AND PREPARATION METHOD THEREOF

(71) Applicant: NANJING TECH UNIVERSITY, Nanjing (CN)

(72) Inventors: Zhirong Wang, Nanjing (CN); Haobo Zhou, Nanjing (CN); Junling Wang, Nanjing (CN); Yangyan Zheng, Nanjing (CN)

(*) Notice: Subject to any disclaimer, the term of this patent is extended or adjusted under 35 U.S.C. 154(b) by 803 days.

(21) Appl. No.: 18/111,589

(22) Filed: Feb. 19, 2023

(65) Prior Publication Data

US 2023/0265261 A1 Aug. 24, 2023

(30) Foreign Application Priority Data

Feb. 19, 2022 (CN) .......................... 202210153680.5

(51) Int. Cl.
| | |
|---|---|
| *C08K 3/22* | (2006.01) |
| *B82Y 30/00* | (2011.01) |
| *B82Y 40/00* | (2011.01) |
| *C08K 7/00* | (2006.01) |
| *C08L 79/08* | (2006.01) |

(52) U.S. Cl.
CPC ................. *C08K 3/22* (2013.01); *C08K 7/00* (2013.01); *C08L 79/085* (2013.01); *B82Y 30/00* (2013.01); *B82Y 40/00* (2013.01); *C08K 2003/2248* (2013.01); *C08K 2201/005* (2013.01); *C08K 2201/011* (2013.01); *C08K 2201/014* (2013.01); *C08L 2201/02* (2013.01)

(58) Field of Classification Search
None
See application file for complete search history.

(56) References Cited

FOREIGN PATENT DOCUMENTS

| CN | 109825734 A | * | 5/2019 | | |
|---|---|---|---|---|---|
| CN | 112745610 A | * | 5/2021 | ............... | C08K 7/26 |
| CN | 113540419 A | * | 10/2021 | ............ | H01M 4/362 |
| CN | 113582352 A | * | 11/2021 | ............. | B82Y 40/00 |

* cited by examiner

*Primary Examiner* — Tanisha Diggs

(74) *Attorney, Agent, or Firm* — Shen Huang

(57) ABSTRACT

The present application discloses a nanocomposite flame retardant. The nanocomposite flame retardant includes 9.7-9.8 wt % of MXene nanosheets, 72.7-76.5 wt % of bimetallic hydroxide and 13.8-17.5 wt % of cuprous oxide particles. The present disclosure further discloses flame-retardant bismaleimide resin added with the nanocomposite flame retardant and a preparation method of the flame-retardant bismaleimide resin. According to the present disclosure, the flame retardant is prepared from magnesium and aluminum elements, so the production cost of the flame retardant is reduced; and meanwhile, the particle size of the cuprous oxide particles is reduced, the specific surface area of cuprous oxide is increased, the catalytic efficiency of the cuprous oxide per unit mass can be improved, and then the flame-retardant and toxicity-reducing effects of products are improved.

10 Claims, 6 Drawing Sheets

1

NANOCOMPOSITE FLAME RETARDANT, FLAME RETARDANT BISMALEIMIDE RESIN AND PREPARATION METHOD THEREOF

TECHNICAL FIELD

The present disclosure relates to a nanocomposite flame retardant, flame-retardant bismaleimide resin prepared by the nanocomposite flame retardant and a preparation method of the flame-retardant bismaleimide resin.

BACKGROUND ART

Bismaleimide (BMI) resin, as an important branch of thermosetting polyimide, can be crosslinked and cured under similar conditions of epoxy resin and unsaturated polyester resin. The bismaleimide can be used as an advanced composite matrix, a high-temperature-resistant insulating material, a high-temperature-resistant structural adhesive, etc. Due to excellent heat resistance, corrosion resistance, radiation resistance and high mechanical property, the bismaleimide is widely applied to the fields of aerospace, transportation and electromechanics.

However, because of high crosslinking and benzene ring structure degrees of a main chain of the BMI, the toughness of the BMI is poor, and further the development and application of the BMI are seriously hindered. Through long-term research and screening, a 4,4'-dimethyl methylene imine diphenylmethane (BDM) and 2,2'-diallyl bisphenol A (DBA) system have gradually developed into the most popular system in the bismaleimide family. The toughness of the BDM and the DBA is enhanced, and the processability is also improved. However, BMI resin prepared based on this system is easy to combust, which causes poor fire safety.

SUMMARY OF THE INVENTION

In order to solve above problems, the present application firstly provides a nanocomposite flame retardant, including:
9.7-9.8 wt % of MXene nanosheets, 72.7-76.5 wt % of bimetallic hydroxide and 13.8-17.5 wt % of cuprous oxide particles.

The particle size of the cuprous oxide particles is 5 to 10 nm.

In the prior art, the bimetallic hydroxide is generally prepared from rare or precious metal, so its cost is high; in addition, the particle size of the cuprous oxide particles is 70 to 90 nm, a great amount of cuprous oxide is wrapped inside the particles, the catalytic effect cannot be realized, and as a result, the flame-retardant effect cannot be effectively achieved. In the present application, the flame retardant is prepared from magnesium and aluminum elements, so the production cost of the flame retardant is reduced; and meanwhile, the particle size of the cuprous oxide particles is reduced, the specific surface area of cuprous oxide is increased, the catalytic efficiency of the cuprous oxide per unit mass can be improved, and then the flame-retardant and toxicity-reducing effects of products are improved.

Further, the nanocomposite flame retardant is prepared by the following preparation method:
etching and stripping $Ti_3AlCl_2$ to obtain the MXene nanosheets;
enabling Cu, Mg and Al trimetal LDH to grow on a single-layer MXene nanosheet to obtain MXene/LDH composite particles; and

then regulating $Cu^{2+}$ in the MXene/LDH into the cuprous oxide particles in situ by ascorbic acid so as to obtain powdery MXene/LDH/$Cu_2O$ (MXLC for short), namely the nanocomposite flame retardant. The nanocomposite flame retardant is a ternary nanocomposite flame retardant.

In the present application, the preparation process of the flame retardant is improved; LDH grows on the single-layer MXene nanosheet in one step by a coprecipitation method, and then ascorbic acid is directly used for in-situ reduction on the LDH to obtain the cuprous oxide. The preparation method not only reduces two steps and reduces process control points, but also can obtain cuprous oxide particles with smaller particle size. In the present application, the LDH is generated by the coprecipitation method, so copper, magnesium and aluminum can form a uniformly-dispersed mixed layer on the single-layer MXene nanosheet; and after reduction, the cuprous oxide particles with very small particle size can be formed. The Cu, Mg and Al trimetal LDH can be firstly prepared, and the three metals are combined by chemical bonds, so that the structure is more stable; and after the copper element is reduced into cuprous oxide, the chemical bond combination is still maintained between the cuprous oxide and the LDH.

In the prior art, MXLC is produced from cuprous oxide nano-powder and LDH by a hydrothermal method; since cuprous oxide is prepared in advance and then directly deposited on the surface of LDH, the prepared cuprous oxide particles are relatively large; since the hydrothermal method is adopted for production, cuprous oxide and LDH are connected together more by virtue of Van der Waals' force; but if the material is combusted, the cuprous oxide particles are easily separated from LDH, and therefore, the cooperativity among the flame retardants cannot be effectively exerted.

Specifically, the preparation method of the nanocomposite flame retardant includes the following steps:

(1) Preparation of MXene Nanosheets:
dissolving lithium fluoride powder in hydrochloric acid to prepare a mixed solution containing hydrofluoric acid; adding $Ti_3AlC_2$ powder into the mixed solution, and maintaining stirring to realize etching reaction; after etching, carrying out first centrifugal treatment to obtain $Ti_3C_2T_x$; centrifugally washing $Ti_3C_2T_x$ with deionized water until the pH value is 6-7; after washing, dispersing $Ti_3C_2T_x$ in deionized water and performing ultrasonic treatment for stripping; finally, carrying out second centrifugal treatment, and collecting an upper suspension to obtain an MXene nanosheet suspension containing the MXene nanosheets; and generating the hydrofluoric acid in the mixed solution by reaction of lithium fluoride and hydrochloric acid;

(2) Preparation of MXene/LDH Composite Particles:
dissolving $CuCl_2 \cdot 2H_2O$, $MgCl_2 \cdot 6H_2O$ and $AlCl_3 \cdot 6H_2O$ in deionized water to prepare a solution A; dissolving NaOH and $Na_2CO_3$ in water to prepare a solution B;
adding deionized water into the MXene nanosheet suspension for dilution and stirring to prepare MXene dispersion liquid;
adding dropwise the solution A into the MXene dispersion liquid to obtain a solution C;
then regulating the pH value of the solution C to be about 9.5-10.5 with the solution B; maintaining stirring for coprecipitation reaction; after the reaction, carrying out third centrifugal treatment to obtain a third precipitate; washing the third precipitate with water and ethyl alcohol; and then carrying out vacuum drying to obtain the MXene/LDH composite particles.

(3) Preparation of MXene/LDH/Cu$_2$O:

dispersing MXene/LDH composite particles in deionized water and performing ultrasonic stirring to obtain MXene/LDH dispersion liquid; then adding dropwise an ascorbic acid solution, and maintaining stirring for reduction reaction; after the reaction, carrying out fourth centrifugal treatment to obtain a fourth precipitate; washing the fourth precipitate with water and ethyl alcohol; and carrying out vacuum drying to obtain the MXene/LDH/Cu$_2$O composite particles.

In the present application, the MXene nanosheets are generated; then, copper, magnesium and aluminum ternary LDH is generated on the MXene nanosheets; and when the ternary LDH is generated, the pH value of the solution C is regulated by an alkaline solution formed by NaOH and Na$_2$CO$_3$; Na$_2$CO$_3$ is used as a buffering agent through which the formed alkaline solution has the property of a buffering solution, thus the pH value of the solution C can accurately regulated, and three elements of copper, magnesium and aluminum can be uniformly deposited on the MXene nanosheets.

In the present application, deposition of copper, magnesium and aluminum metals is carried out in a pH value range of 9.5-10.5; metal ions cannot be completely deposited if the pH value is too low; and an LDH lamellar structure cannot be formed if the pH value is too high and the reaction is too fast.

Specifically, in the step (1), the concentration of lithium fluoride in a lithium fluoride solution is 50 g/L, and the concentration of hydrochloric acid is 9-12 mol/L; and during etching reaction, the reaction temperature is 35-45° C., and the reaction time is 24-48 h; and MXene is subjected to ultrasonic treatment in deionized water for 0.5-1 h;

the first centrifugal treatment is carried out for 5 min under a condition of 3,500 rpm;

the second centrifugal treatment is carried out for 10 min under a condition of 3,500 rpm; and the mass ratio of lithium fluoride to Ti$_3$AlC$_2$ powder is 1:1.

The raw material proportion must meet that lithium fluoride and hydrochloric acid generate excessive hydrofluoric acid because enough hydrofluoric acid enables complete etching of aluminum in Ti$_3$AlC$_2$; under the abovementioned reaction temperature and time, the etching efficiency can be ensured; MXene will be oxidized if the time is too long or the temperature is too high; and etching cannot be completed if the time is too short or the temperature is too low.

In a specific embodiment, in the step (2), when MXene/LDH composite particles are prepared, the volume ratio of the solution A to the MXene dispersion liquid is 1:6;

in the solution A, the total concentration of CuCl$_2$·2H$_2$O, MgCl$_2$·6H$_2$O and AlCl$_3$·6H$_2$O is 140.2 g/L; and in the solution A, the molar ratio of CuCl$_2$·2H$_2$O to MgCl$_2$·6H$_2$O to AlCl$_3$·6H$_2$O is 3:2:2; in the MXene dispersion liquid, the concentration of MXene is 1 g/L;

in the solution B, the concentration of NaOH is 1.6 mol/L, and the concentration of Na$_2$CO$_3$ is 0.8 mol/L;

in the coprecipitation reaction, the reaction temperature is 25-30° C., and the reaction time is 12-24 h.

The MXene nanosheets have a large specific surface area; and sufficient LDH can be formed by a large amount of metal salt and coat the surfaces of MXene, so that the spacing of the MXene sheets is opened, and lamellar accumulation can be avoided.

Specifically, the mass concentration of the MXene/LDH composite particles in the MXene/LDH solution is 10 g/L;

the concentration of ascorbic acid in the ascorbic acid solution is 0.1 mol/L; and the pH value is regulated to be 9-10 by a 0.4 mol/L NaOH solution;

the mass ratio of the ascorbic acid to the MXene/LDH composite particles is 3:2;

in the reduction reaction, the reaction temperature is 50° C., and the reaction time is 8-10 h.

The ascorbic acid solution is adjusted to be alkaline so as to avoid destroying the structure of LDH; and under the reaction conditions, it can be ensured that Cu$^{2+}$ on the surface of LDH can be completely reduced.

Then, the present application further discloses flame-retardant bismaleimide resin which contains any one of the nanocomposite flame retardants described above. Specifically, the content of the nanocomposite flame retardant in the flame-retardant bismaleimide resin is 2-6 wt %. Further, the content of the nanocomposite flame retardant in the flame-retardant bismaleimide resin is preferably 4 wt %.

The flame-retardant bismaleimide resin prepared from the nanocomposite flame retardant in the present application has a good flame-retardant effect; the carbon yield ratio of the flame-retardant bismaleimide resin is increased by 2.9-7.6 times compared with that of pure BMI under an air condition and can be increased by 1.3-4.2 times compared with those of MXene, LDH and Cu$_2$O which serve as the flame retardants; moreover, the heat release during BMI combustion can be greatly inhibited, thus the limit oxygen index of BMI is increased; and especially when the content of the nanocomposite flame retardant is 4%, more outstanding flame-retardant effect can be achieved. Then, the present application further discloses a production method of the flame-retardant bismaleimide resin. The production method includes the following steps:

mixing Mxene/LDH/Cu$_2$O powder and 2,2'-diallyl bisphenol A, and performing ultrasonic stirring for 30 min in a water bath at 80° C. to obtain a first mixed solution;

adding N,N'-(4,4'-methylenediphenyl)bismaleimide into the first mixed solution and stirring for 20-30 min in an oil bath at 130° C. to obtain a prepolymer;

pouring the prepolymer into a mold and subjected to vacuum degassing for 30 min at 130° C.; transferring the prepolymer into a drying oven for curing after vacuum degassing; and after curing, naturally cooling the prepolymer to obtain the flame-retardant bismaleimide resin;

the temperature control in curing is as follows in sequence: firstly, the temperature is increased to be 150° C. for the first time, and the temperature is maintained for 2 h; then the temperature is increased to be 180° C. for the second time, and the temperature is maintained for 2 h; the temperature is increased to be 200° C. for the third time, and the temperature is maintained for 2 h; the temperature is increased to be 220° C. for the fourth time, and the temperature is maintained for 2 h; and finally, the temperature is increased to be 240° C. for the fifth time, and the temperature is maintained for 4 h; and the mass ratio of 2,2'-diallyl bisphenol A to N,N'-(4,4'-methylenediphenyl)bismaleimide is 2:3.

By the abovementioned method, the generation of the flame-retardant bismaleimide resin can be smoothly completed, and Mxene/LDH/Cu$_2$O powder can be uniformly dispersed in the bismaleimide resin.

BRIEF DESCRIPTION OF THE DRAWINGS

FIG. 6 (b) is Cu, Mg and Al trimetal LDH growing on MXene sheets; FIG. 6 (c) is a transmission electron microscope diagram of MXene/LDH/$Cu_2O$; FIG. 6 (d) is a local amplification diagram of FIG. 6 (c); FIG. 6 (e) is a scanning electron microscope diagram of MXene/LDH/$Cu_2O$; and FIG. 6 (f) is a local amplification diagram of FIG. 6 (e).

FIG. 7 (c) shows a thermogravimetric result in an air atmosphere; and FIG. 7 (b) and FIG. 7 (d) show DTG curves of a resin sample in nitrogen and air respectively.

DETAILED DESCRIPTION OF THE INVENTION

Embodiment 1

Figure 1:
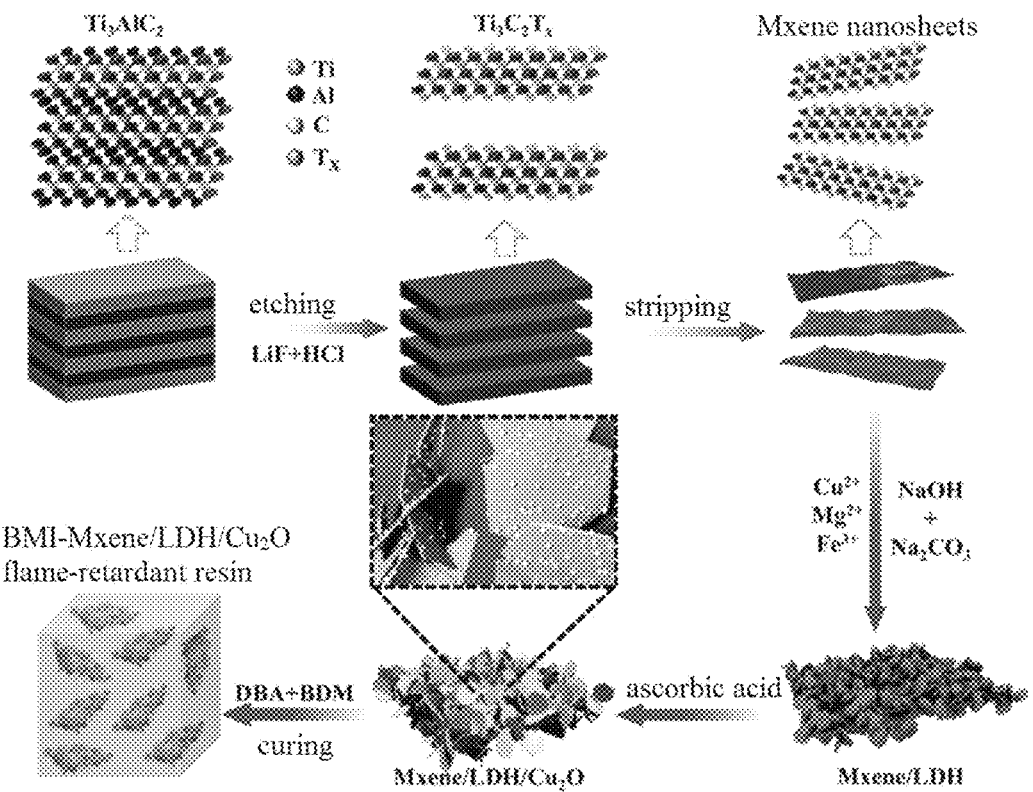
FIG. 1 is a flow schematic diagram of an embodiment of the present disclosure.

As shown in FIG. 1, preparation of a nanocoposite flame retardant specifically included the following steps:

(1) Preparation of MXene Nanosheets:

dissolving 1 g of lithium fluoride powder in 20 mL of hydrochloric acid to prepare a mixed solution containing hydrofluoric acid, wherein the concentration of the hydrochloric acid was 9 mol/L; adding 1 g of $Ti_3AlC_2$ powder into the mixed solution; maintaining stirring; and carrying out an etching reaction in a water bath at 35° C. for 24 h; after the etching reaction, carrying out first centrifugal treatment at a speed of 3,500 rpm; collecting a lower precipitate to obtain $Ti_3C_2T_x$; washing $Ti_3C_2T_x$ with deionized water until the pH value was 6-7; after flushing, dispersing $Ti_3C_2T_x$ in the deionized water and carrying out ultrasonic treatment for stripping; finally carrying out second centrifugal treatment at a rotation speed of 3,500 rpm; and collecting an upper suspension to obtain a MXene nanosheet suspension containing the MXene nanosheets.

(2) Preparation of MXene/LDH Composite Particles:

Preparation of a solution A: dissolving 2.57 g (0.015 mol) of $CuCl_2 \cdot 2H_2O$, 2.03 g (0.01 mol) of $MgCl_2 \cdot 6H_2O$ and 2.41 g (0.01 mol) of $AlCl_3 \cdot 6H_2O$ in deionized water and blending to reach 50 mL; and stirring for 30 min to obtain the solution A.

Preparation of MXene dispersion liquid: taking the MXene nanosheet suspension obtained in the step (1); after concentration detection, regulating the MXene nanosheet suspension until the concentration of MXene was 1 mg/mL; and taking 300 mL of the MXene nanosheet suspension as the MXene dispersion liquid.

Preparation of a solution B: dissolving NaOH and $Na_2CO_3$ in deionized water and stirring for 30 min to obtain the solution B, wherein the concentration of NaOH was 1.6 mol/L, and the concentration of $Na_2CO_3$ was 0.8 mol/L.

Dripping 50 mL of the solution A into 300 mL of the MXene dispersion liquid to obtain a solution C; maintaining stirring; then regulating the pH value of the solution C to be 10 by the solution B; stirring for 24 h for a coprecipitation reaction; after the reaction, carrying out third centrifugal treatment at a rotation speed of 10,000 rpm to obtain a third precipitate; washing the third precipitate with water for three times, and washing with ethyl alcohol for three times; and then performing vacuum drying on the third precipitate to obtain the MXene/LDH composite particles.

(3) Preparation of MXene/LDH/$Cu_2O$ (MXLC):

preparing 200 mL of 0.1 mol/L ascorbic acid solution, and regulating the pH value of the ascorbic acid solution to be 9 by a 0.4 mol/L NaOH solution;

dispersing the product MXene/LDH composite particles in the step 2 in 200 mL of water and performing ultrasonic stirring for 10 min to obtain an MXene/LDH solution; slowly dripping the ascorbic acid solution into the MXene/LDH solution and performing reduction reaction in a water bath at 50° C.; maintaining stirring; and performing third hydrothermal reaction for 9 h; after the reaction, carrying out fourth centrifugal treatment at a rotation speed of 10,000 rpm to obtain a fourth precipitate; washing the fourth precipitate with water for three times, and washing with ethyl alcohol for three times; performing vacuum drying on the product to obtain powdery MXene/LDH/$Cu_2O$ composite particles, namely the nanocomposite flame retardant. In the nanocomposite flame retardant, the MXene nanosheets accounted for 9.7-9.8 wt %, bimetallic hydroxide accounted for 74.5-74.8%, and cuprous oxide particles accounted for 15.5-15.7 wt %.

Embodiment 2

As shown in FIG. 1, production of flame-retardant bismaleimide resin included the following steps:

mixing 2 g of the Mxene/LDH/$Cu_2O$ composite particle powder produced in the Embodiment 1 with 39.2 g of 2,2'-diallyl bisphenol A (DBA), and ultrasonically stirring the mixture in a water bath at 80° C. for 30 min; adding 58.8 g of N,N'-(4,4'-methylenediphenyl)bismaleimide (BDM), and stirring in an oil bath at 130° C. for 20-30 min to obtain a prepolymer; pouring the prepolymer into a mold and subjected to vacuum degassing at 130° C. for 30 min; transferring the prepolymer into a drying oven for curing; and after the curing, naturally cooling the prepolymer to obtain the product.

In this embodiment, the temperature control in curing was as follows in sequence: firstly, the temperature was increased to be 150° C. for the first time, and the temperature was maintained for 2 h; then the temperature was increased to be 180° C. for the second time, and the temperature was maintained for 2 h; the temperature was increased to be 200° C. for the third time, and the temperature was maintained for 2 h; the temperature was increased to be 220° C. for the fourth time, and the temperature was maintained for 2 h; and finally, the temperature was increased to be 240° C. for the fifth time, and the temperature was maintained for 4 h. A sample BMI/2.0MXLC was obtained.

In this embodiment, the mixing amount of Mxene/LDH/$Cu_2O$ was 2 wt %, namely the mass ratio of Mxene/LDH/$Cu_2O$ to (DBA+BDM) was 2:98, wherein the mass ratio of DBA to BDM was 2:3.

Embodiment 3

This embodiment was basically the same as the Embodiment 2, and the difference was that the mixing amount of Mxene/LDH/$Cu_2O$ was 4 wt %. A sample BMI/4.0MXLC was obtained.

Embodiment 4

This embodiment was basically the same as the Embodiment 2, and the difference was that the mixing amount of Mxene/LDH/$Cu_2O$ was 6 wt %. A sample BMI/6.0MXLC was obtained.

Comparative Embodiment 1

This embodiment was basically the same as the Embodiment 2, and the difference was that Mxene/LDH/$Cu_2O$ was replaced by the MXene nanosheets, and a sample BMI/2.0Mxene was obtained. The MXene nanosheets were obtained by freeze-drying the MXene nanosheet suspension obtained in the step (1) in the Embodiment 1.

Comparative Embodiment 2

This embodiment was basically the same as the Embodiment 2, and the difference was that Mxene/LDH/$Cu_2O$ was replaced by MgAl-LDH. A sample BMI/2.0LDH was obtained. The preparation method of the MgAl-LDH included the following steps:

dissolving 3.55 g (0.0175 mol) of $MgCl_2 \cdot 6H_2O$ and 4.22 g (0.0175 mol) of $AlCl_3 \cdot 6H_2O$ in 250 mL of deionized water, and stirring for 30 min to obtain the solution A; dissolving 3.2 g of NaOH (0.08 mol) and 4.24 g (0.04 mol) of $Na_2CO_3$ in 50 mL of water, and stirring for 30 min to obtain the solution B; then regulating the pH value of the solution A to be about 10 by the solution B, and the stirring for 24 h; and then centrifuging product at 10,000 rpm, washing with water for three times, washing with ethyl alcohol for three times, and then performing vacuum drying to obtain MgAl-LDH.

Comparative Embodiment 3

This embodiment was basically the same as the Embodiment 2, and the difference was that Mxene/LDH/$Cu_2O$ was replaced by $Cu_2O$. A sample BMI/2.0$Cu_2O$ was obtained. The preparation method of $Cu_2O$ included the following steps:

mixing 300 mL of a $CuCl_2$-$2H_2O$ solution having a concentration of 0.01 mol/L and 60 mL of a sodium hydroxide solution having a concentration of 1 mol/L and then stirring for 30 min; then adding 60 mL of an ascorbic acid aqueous solution having a concentration of 0.5 mol/L, and stirring in a water bath at 50° C. for 5 h; then centrifugally separating the product at a rotation speed of 10,000 rpm to obtain a precipitate; washing the precipitate with deionized water and ethyl alcohol; and finally performing vacuum drying on the product at 60° C. to prepare cuprous oxide $Cu_2O$.

Detection:

X-ray photoelectron spectroscopy (XPS) test was performed by an ESCALAB250XiX ray photoelectron spectrometer (ThermoScientific, U.S.A). X-ray diffraction (XRD) test was performed by an ARLEQUINOX3000X ray diffractometer (ThermoScientific, U.S.A). Transmission electron microscope (TEM) test was performed by a JEOLJEM-2100F microscope (Japanese JEOL). Scanning electron microscope (SEM) test was performed by a TM3000 microscope (Japanese Hitachi). Thermogravimetric analysis (TGA) test was performed by an SDTQ600TGA analyzer (TAInstruments, U.S.A); and combustion test was performed by a cone calorimeter (FTT, UK).

Figure 2:
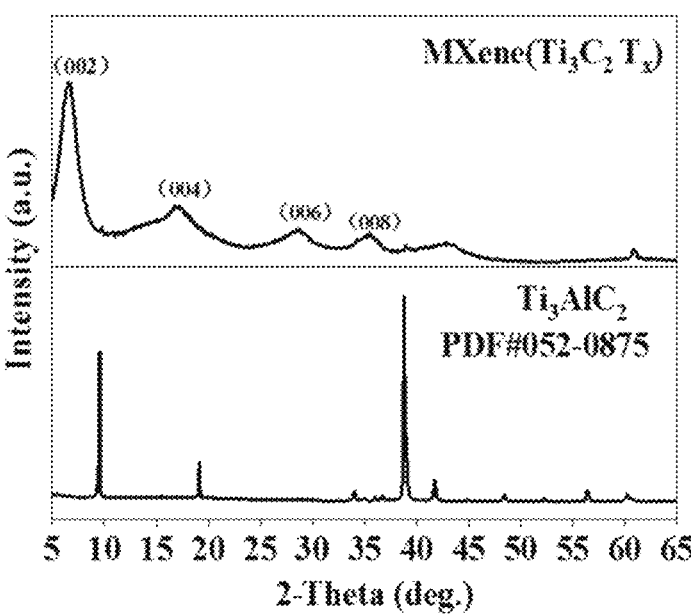
FIG. 2 is an XRD spectral line of a $Ti_3AlC_2$ raw material and stripped MXene nanosheets.
Figure 3:
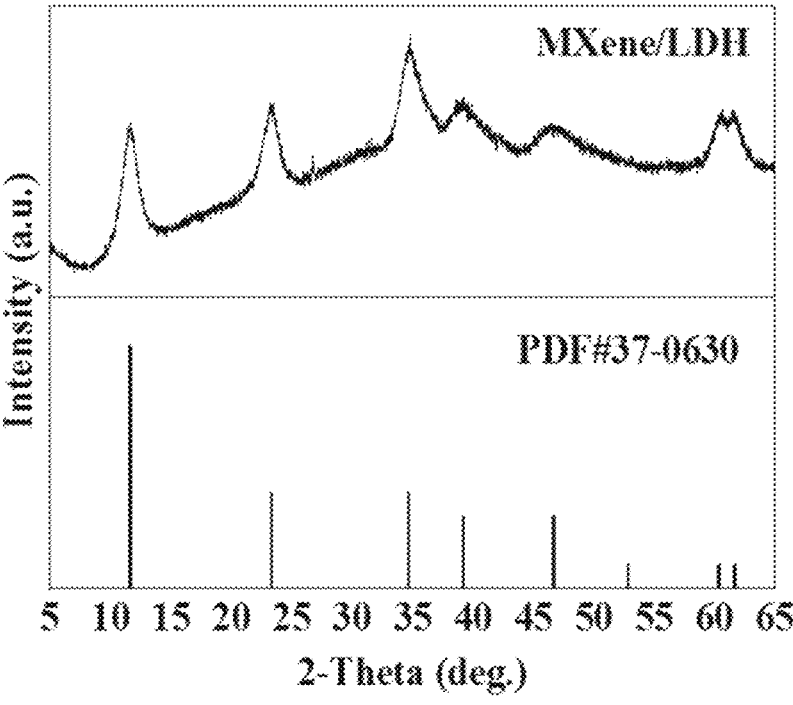
FIG. 3 is an XRD spectral line after LDH grows on MXene.
Figure 4:
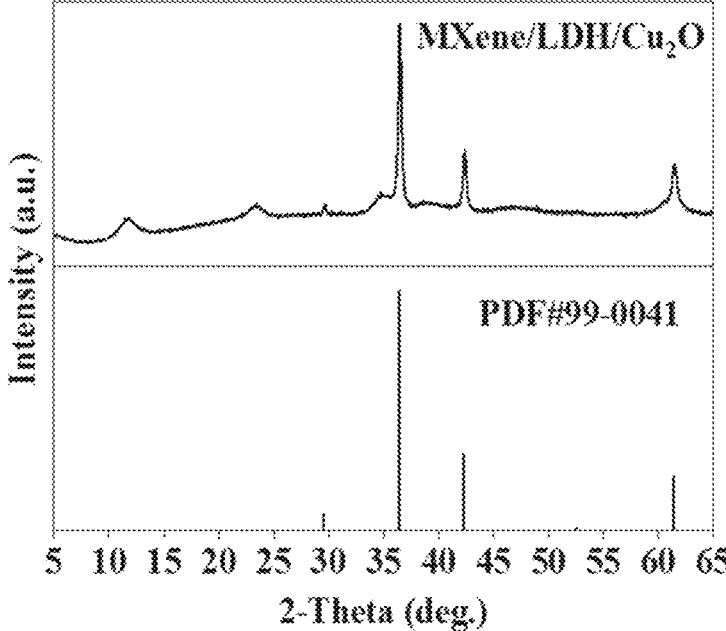
FIG. 4 is an XRD spectral line of a product after in-situ reduction of $Cu_2O$.
Figure 5:
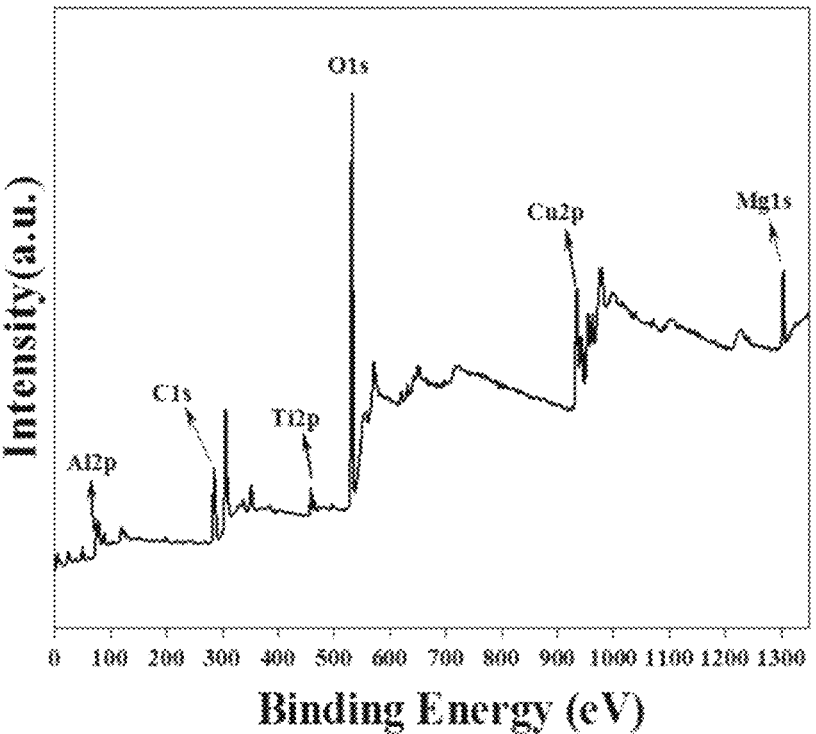
FIG. 5 is an XPS spectral line of an MXene/LDH/$Cu_2O$ product.

1. All materials are detected to obtain accompanying drawings as shown in FIG. 2 to FIG. 6. FIG. 2 is the XRD spectral line of a $Ti_3AlC_2$ raw material and stripped MXene nanosheets; $Ti_3AlC_2$ conforms to a standard PDF card; and after MXene sheets are prepared, a 002 crystal surface is shifted to a small angle, which reflects that etching and stripping increase the spacing of the sheets. FIG. 3 is the XRD spectral line after LDH grows on MXene, and the diffraction peak of the XRD spectral line is consistent with that of the standard PDF card of the LDH; and as the MXene sheets are coated by the LDH, the diffraction peak of the MXene cannot be displayed. FIG. 4 is the XRD spectral line of the product after in-situ reduction of $Cu_2O$, and shows a standard $Cu_2O$ diffraction peak (PDF #99-0041) besides the original diffraction peak of the LDH. FIG. 5 is the XPS spectral line of the MXene/LDH/$Cu_2O$ product, including elements of Ti, C, Cu, Mg and Al.

Figure 6:
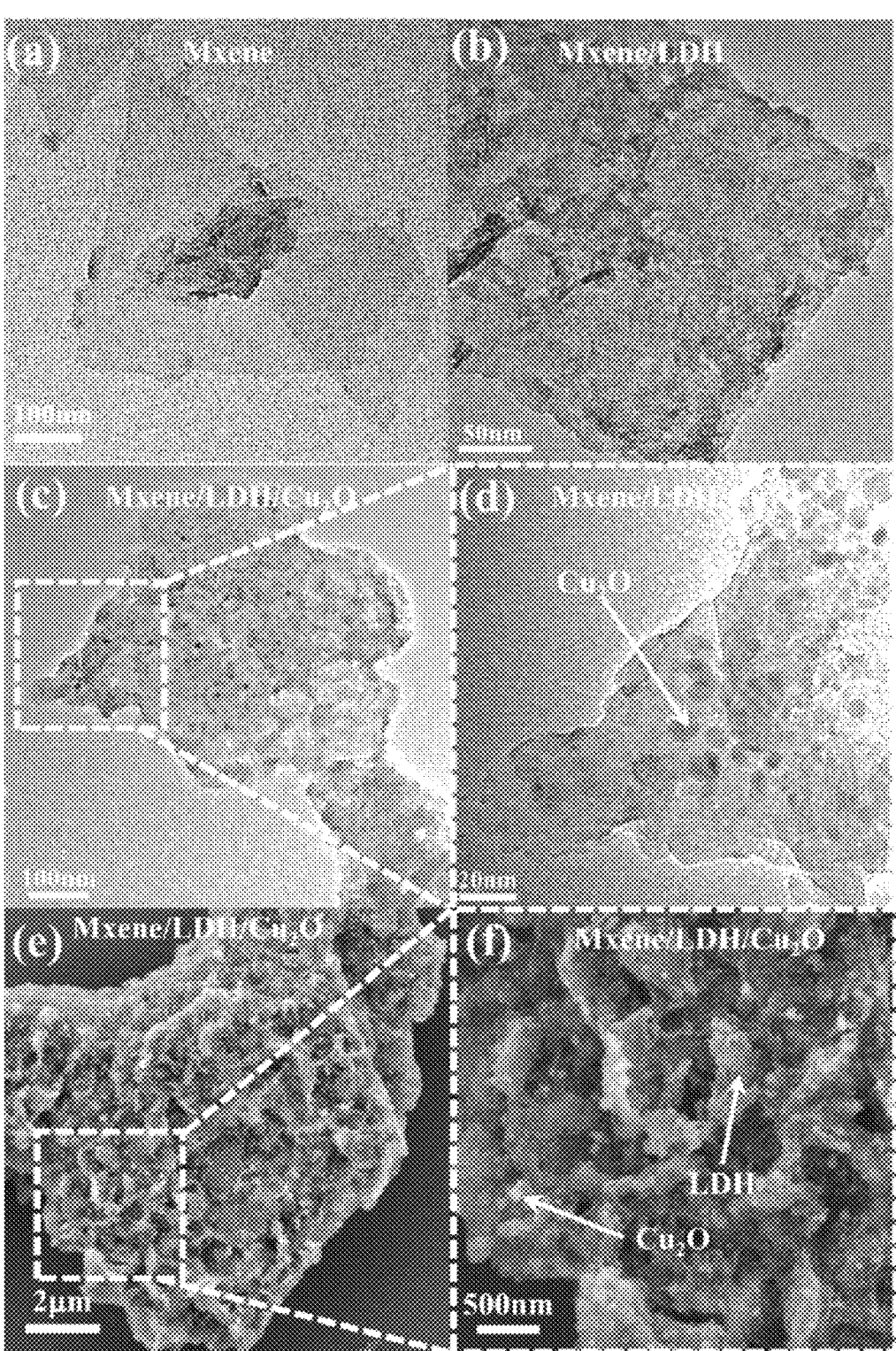
In FIG. 6, FIG. 6 (a) is a transmission electron microscope diagram of MXene nanosheets.

FIG. 6 (*a*) is the transmission electron microscope diagram of the MXene nanosheets, and the morphology of the MXene nanosheet can be clearly seen. FIG. 6 (*b*) shows Cu, Mg and Al trimetal LDH growing on the MXene sheets; FIG. 6 (*c*) and FIG. 6 (*d*) are transmission electron microscope diagrams of MXene/LDH/$Cu_2O$, and $Cu_2O$ particles on the LDH sheets can be seen after local amplification. FIG. 6 (*e*) and FIG. 6 (*f*) are scanning electron microscope diagrams of MXene/LDH/$Cu_2O$, and the morphology of the LDH sheets and the $Cu_2O$ particles can be seen more visually. In conclusion, it can be determined that the components and structures of intermediate products and final products in each step are in line with experimental design.

2. The flame-retardant bismaleimide resin prepared in the Embodiment 2 and pure BMI resin are detected to obtain data in each accompanying drawing shown in FIG. 7 and Table 1, wherein the pure BMI is produced from mixed resin of DBA and BDM in a mass ratio of 2:3 by the method in the Embodiment 2.

Figure 7:
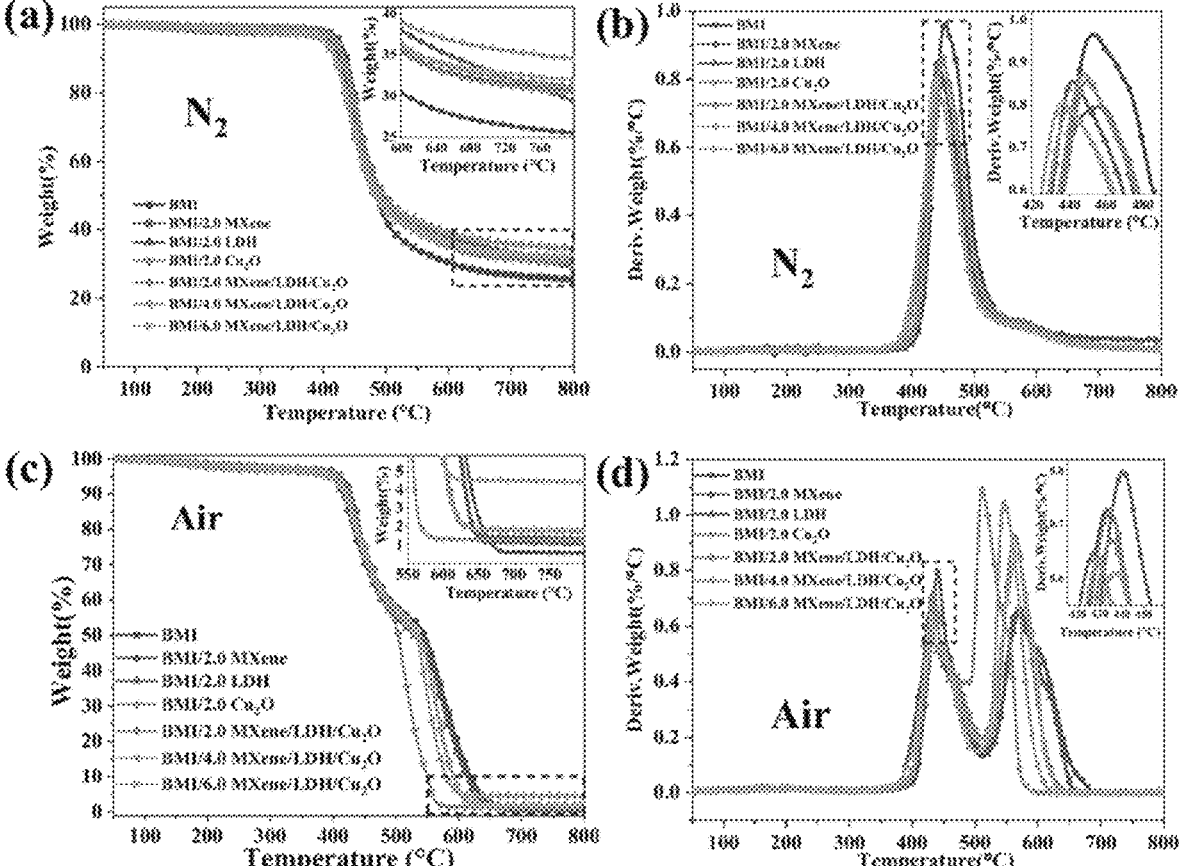
In FIG. 7, FIG. 7 (a) shows a thermogravimetric analysis result of a resin sample in an N2 atmosphere.

FIG. 7 (*a*) shows the thermogravimetric analysis result of the resin sample in the N2 atmosphere, and the carbon yield ratio can reflect the catalytic carbon forming efficiency of the flame retardant. The carbon yield ratio of pure BMI resin is only 25.48%; after 2% of MXene, LDH and $Cu_2O$ are added, the carbon yield ratios are increased to 29.41%, 30.68% and 30.31% respectively; and after 2% of MXene/LDH/$Cu_2O$ composite flame retardant is added, the carbon yield ratio of the resin reaches 31.16%, and the carbon forming effect is better than that of the resin added with three components separately. If MXene is added separately, metal oxide catalytic particles are lacked, so the carbon forming effect is poor. If LDH or $Cu_2O$ is added separately, although metal oxide particles can be provided as a carbon forming catalyst, the barrier effect and physical support of the MXene sheets are lacked, and a large carbon layer is difficult to form. The MXene/LDH/$Cu_2O$ composite particles can provide metal oxide for efficiently catalyzing carbon forming; the MXene nanosheets have high-temperature thermal stability and can serve as a supporting framework of carbon residues, thus a large-area carbon layer is further formed; and therefore, if each flame-resistant retardant is the sample with the addition amount of 2%, an MI/2.0MXLC sample has the highest carbon yield ratio. The thermogravimetric result in the air atmosphere in FIG. 7(c) also shows the same trend, that is, the carbon yield ratio of 2% of MXene/LDH/Cu$_2$O is higher than that of the flame-retardant particles with the three components separately, which indicates that the composite flame-retardant particles can achieve a better flame-retardant effect when combustion occurs.

FIG. 7 (b) and FIG. 7 (d) show DTG curves of the resin sample in nitrogen and air respectively, which reflect the the collapse of the composite resin structure caused by LDH decomposition in the composite particles. Therefore, the addition amount of the composite flame-retardant particles in the BMI resin is not too high.

Thermogravimetric analysis is carried out on the Embodiments and the Comparative Embodiments, and specific data is listed in Table 1.

TABLE 1

| | | Nitrogen atmosphere | | | Air atmosphere | | |
|---|---|---|---|---|---|---|---|
| | Sample | MNLR (%/° C.) | T$_{MNLR}$ (° C.) | Carbon yield ratio (%) | MNLR-1 (%/° C.) | T$_{MNLR-1}$ (° C.) | Carbon yield ratio (%) |
| Blank | Pure BMI | 0.96 | 453.3 | 25.48 | 0.73 | 433.0 | 0.59 |
| Comparative Embodiment 1 | BMI/2.0 MXene | 0.8 | 456.0 | 29.41 | 0.8 | 440.3 | 1.07 |
| Comparative Embodiment 2 | BMI/2.0 LDH | 0.85 | 441.7 | 30.65 | 0.65 | 427.3 | 1.34 |
| Comparative Embodiment 3 | BMI/2.0 Cu$_2$O | 0.87 | 447.7 | 30.31 | 0.72 | 434.7 | 1.23 |
| Embodiment 1 | BMI/2.0 MXLC | 0.86 | 449.3 | 31.16 | 0.67 | 435.3 | 1.73 |
| Embodiment 2 | BMI/4.0 MXLC | 0.79 | 440.3 | 34.55 | 0.61 | 437.0 | 4.48 |
| Embodiment 3 | BMI/6.0 MXLC | 0.8 | 436.3 | 31.94 | 0.63 | 429.0 | 1.83 | decomposition rate and thermal stability of the resin. After the flame retardant is added, the maximum mass loss rate of the resin is reduced, which indicates that the flame-retardant particles can reduce the pyrolysis rate of the resin and reduce the generation of combustible gas. In nitrogen, the T$_{MMLR}$ of the resin sample compounded with the LDH, Cu$_2$O and MXLC particles is earlier than that of the pure BMI resin because the particles are heated and decomposed independently and the generated metal oxide particles catalyze the resin to be decomposed into carbon in advance; and the carbon layer formed in advance is stable at high temperature, plays a blocking effect, and blocks the contact of oxygen and heat with the resin, thereby reducing the degree of subsequent combustion, making the resin not completely combusted, and improving the carbon yield ratio. In the air atmosphere, because oxygen participates in combustion, the thermal stability of the BMI resin is reduced, and the temperature (T$_{MMLR}$) corresponding to the maximum decomposition rate of the pure BMI resin is greatly advanced to 433° C.; the reduction range of the T$_{MMLR}$ of the flame-retardant resin is not so large, except the easily decomposed LDH, and the T$_{MMLR}$ of the rest samples is higher than that of the pure BMI resin; and the T$_{MMLR}$ of BMI/2.0MXLC is 435.3° C., which indicates that the composite flame retardant can improve the thermal stability of the resin. Therefore, in case of combustion, the flame-retardant particles can reduce the pyrolysis rate of the resin and improve the thermal stability of the resin, so the fire hazard can be reduced.

With the increase of the mixing amount of the composite flame-retardant particles, the carbon yield ratio of BMI4.0MXLC is further increased; if the mixing amount reaches 6%, the carbon yield ratio will be reduced, and the maximum mass loss rate will not continuously reduced, which might be because a carbon layer is not formed due to As shown in Table 1, the pure BMI is produced from mixed resin of DBA and BDM in a mass ratio of 2:3 by the method in the Embodiment 2. MIMER (maximum mass loss rate) represents the maximum mass loss rate and reflects the intensity of decomposition and combustion of the resin at high temperature. T$_{MMLR}$ represents the corresponding temperature under the maximum mass loss rate.

3. The flame-retardant bismaleimide resin prepared in the Embodiment 2 and the pure BMI resin are detected to obtain each accompanying drawing shown in FIG. 8 and data in Table 2, wherein the pure BMI is produced from the mixed resin of DBA and BDM in a mass ratio of 2:3 by the method in the Embodiment 2.

TABLE 2

| | Fire safety test data. | | |
|---|---|---|---|
| Sample | Peak heat release rate (kW/m$^2$) | Total heat release (600 s) (MJ/m$^2$) | Limit oxygen index (%) |
| Pure BMI | 440.95 | 65.59 | 30.6 |
| BMI/2.0 MXene | 304.31 | 45.83 | 31.5 |
| BMI/2.0 LDII | 308.48 | 49.75 | 32 |
| BMI/2.0 Cu$_2$O | 330.16 | 63.37 | 31.1 |
| BMI/2.0 MXLC | 281.24 | 44.27 | 32.9 |
| BMI/4.0 MXLC | 243.82 | 40.67 | 33.1 |
| BMI/6.0 MXLC | 345.5 | 47.15 | 33.2 |

Figure 8:
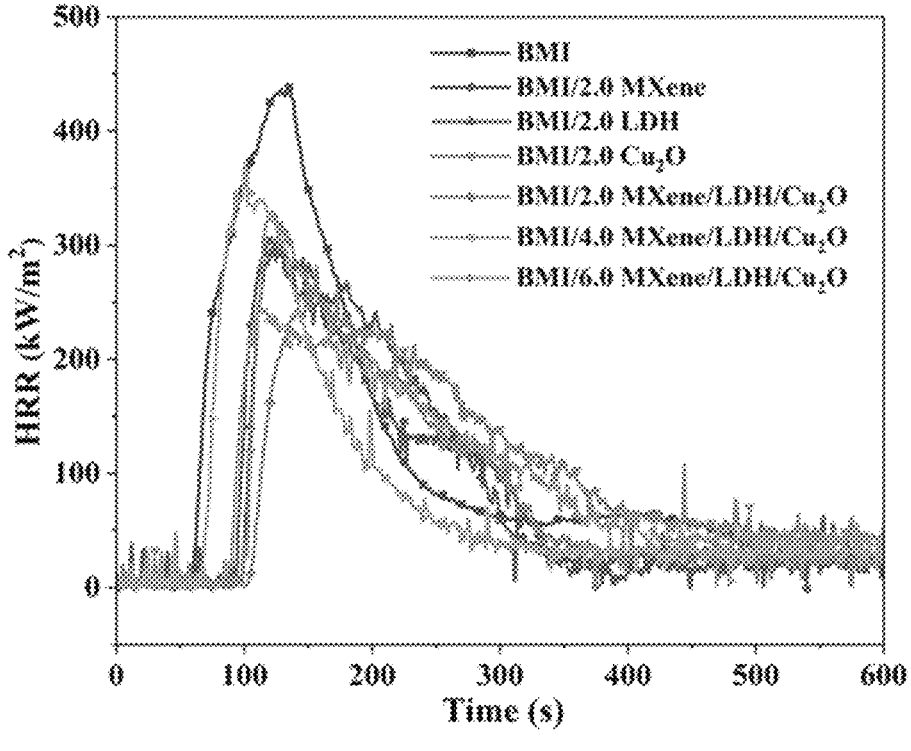
FIG. 8 is a heat release rate (HRR) diagram of a pure BMI resin sample and a flame-retardant BMI resin sample.

FIG. 8 shows the result comparison of the heat release rate (HRR) of the pure BMI resin sample and the flame-retardant BMI resin sample. The flame-retardant particles have an obvious inhibiting effect on the heat release of the BMI resin. Data in Table 2 show that compared with the pure BMI resin, the heat release rate of BMI/2.0MXLC is reduced by 36.2%, and the total heat release is reduced by 32.5%. It indicates that MXene/LDH/Cu$_2$O has a very efficient inhibiting effect on the heat risk of BMI resin in combustion; and under the same mixing amount, the effect is the best in the MXLC sample with the mixing amount of 2%. The reduction range of HRR and THR is also higher than that of the resin sample with the same mixing amount of 2% in the prior art, which indicates that the improvement of the flame retardant in all aspects improves the flame retardancy. In addition, the result of the limit oxygen index also indicates that the improvement of the oxygen index by MXene/LDH/ $Cu_2O$ is better than that by the flame-retardant particles with a single component; and these trends are also consistent with the test result of TGA.

The results of TGA thermoanalysis, cone calorimetric combustion and limit oxygen index tests show that 4% is the mixing amount for realizing the best flame retardancy. It is worth noting that the flame retardancy under the mixing amount of 4% is doubled relative to that under the mixing amount of 2%. However, the improvement amplitude of various index properties is relatively small, which indicates that the effect of the flame retardant has a marginal effect and is not the more the better.

In conclusion, the unique components and structure of MXene/LDH/$Cu_2O$ will form realize a synergistic flame retardant effect, improve the combustion carbon yield ratio and limit oxygen index of the BMI resin, and inhibit decomposition heat release in combustion, thereby effectively reducing the fire safety hazard of BMI resin.

What is claimed is:

1. A nanocomposite flame retardant, comprising:
9.7-9.8 wt % of MXene nanosheets,
72.7-76.5 wt % of bimetallic hydroxide, and
13.8-17.5 wt % of cuprous oxide particles.

2. The nanocomposite flame retardant according to claim 1, wherein a particle size of the cuprous oxide particles is 5 to 10 nm.

3. The nanocomposite flame retardant according to claim 1, prepared by the following preparation method:
etching and stripping $Ti_3AlC_2$ to obtain the MXene nanosheets;
enabling Cu, Mg and Al trimetal layered double hydroxide (LDH) to grow on a single-layer MXene nanosheet to obtain MXene/LDH composite particles; and
reducing $Cu^{2+}$ in the MXene/LDH composite particles into the cuprous oxide particles in situ by ascorbic acid to obtain a powdery MXene/LDH/$Cu_2O$ nanocomposite flame retardant, wherein the nanocomposite flame retardant is a ternary nanocomposite flame retardant.

4. The nanocomposite flame retardant according to claim 3, wherein the preparation method comprises the following steps:
(1) preparation of MXene nanosheets:
dissolving lithium fluoride powder in hydrochloric acid to prepare a mixed solution containing hydrofluoric acid; adding $Ti_3AlC_2$ powder into the mixed solution, and maintaining stirring to realize etching reaction; after etching, carrying out a first centrifugal treatment to obtain MXene; centrifugally washing MXene with deionized water until the pH value is 6-7; after washing, dispersing MXene in deionized water and performing ultrasonic treatment for stripping; carrying out a second centrifugal treatment, and collecting an upper suspension to obtain an MXene nanosheet suspension containing the MXene nanosheets;
(2) preparation of MXene/LDH composite particles:
dissolving $CuCl_2 \cdot 2H_2O$, $MgCl_2 \cdot 6H_2O$ and $AlCl_3 \cdot 6H_2O$ in deionized water to prepare a solution A;

12 dissolving NaOH and $Na_2CO_3$ in water to prepare a solution B;
adding deionized water into the MXene nanosheet suspension for dilution and stirring to prepare MXene dispersion liquid;
adding dropwise the solution A into the MXene dispersion liquid to obtain a solution C;
then regulating the pH value of the solution C to be about 9.5-10.5 with the solution B;
maintaining stirring for coprecipitation reaction; after the reaction, carrying out a third centrifugal treatment to obtain a third precipitate; washing the third precipitate with water and ethyl alcohol; and then carrying out vacuum drying to obtain the MXene/LDH composite particles;
(3) preparation of MXene/LDH/$Cu_2O$:
dispersing MXene/LDH composite particles in deionized water and performing ultrasonic stirring to obtain MXene/LDH dispersion liquid; then adding dropwise an ascorbic acid solution, and maintaining stirring for reduction reaction; after the reaction, carrying out a fourth centrifugal treatment to obtain a fourth precipitate; washing the fourth precipitate with water and ethyl alcohol; and carrying out vacuum drying to obtain the MXene/LDH/$Cu_2O$ composite particles.

5. The nanocomposite flame retardant according to claim 4, wherein
in the step (1), the concentration of lithium fluoride in a lithium fluoride solution is 50 g/L, and the concentration of hydrochloric acid is 9-12 mol/L; and during etching reaction, the reaction temperature is 35-45° C., and the reaction time is 24-48 h; and MXene is subjected to ultrasonic treatment in deionized water for 0.5-1 h;
the first centrifugal treatment is carried out for 5 min under a condition of 3,500 rpm;
the second centrifugal treatment is carried out for 10 min under a condition of 3,500 rpm;
the mass ratio of lithium fluoride to $Ti_3AlC_2$ powder is 1:1.

6. The nanocomposite flame retardant according to claim 4, wherein
in the step (2), when MXene/LDH composite particles are prepared, the volume ratio of the solution A to the MXene dispersion liquid is 1:6;
in the solution A, the total concentration of $CuCl_2 \cdot 2H_2O$, $MgCl_2 \cdot 6H_2O$ and $AlCl_3 \cdot 6H_2O$ is 140.2 g/L; and in the solution A, the molar ratio of $CuCl_2 \cdot 2H_2O$ to $MgCl_2 \cdot 6H_2O$ to $AlCl_3 \cdot 6H_2O$ is 3:2:2;
in the MXene dispersion liquid, the concentration of MXene is 1 g/L;
in the solution B, the concentration of NaOH is 1.6 mol/L, and the concentration of $Na_2CO_3$ is 0.8 mol/L;
in the coprecipitation reaction, the reaction temperature is 25-30° C., and the reaction time is 12-24 h.

7. The nanocomposite flame retardant according to claim 4, wherein the mass concentration of MXene/LDH composite particles in the MXene/LDH dispersion liquid is 10 g/L; the concentration of ascorbic acid in the ascorbic acid solution is 0.1 mol/L; and the pH value is regulated to be 9-10 by a 0.4 mol/L NaOH solution;
the mass ratio of the ascorbic acid to the MXene/LDH composite particles is 3:2;
in the reduction reaction, the reaction temperature is 50° C., and the reaction time is 8-10h.

8. A flame-retardant bismaleimide resin, containing the nanocomposite flame retardant of any one of claim 1.

9. The flame-retardant bismaleimide resin according to claim 8, wherein the content of the nanocomposite flame retardant is 2-6 wt %.

10. A production method of the flame-retardant bismaleimide resin of claim 8, comprising the following steps:

Mixing MXene/LDH/Cu$_2$O powder and 2,2'-diallyl bisphenol A, and performing ultrasonic stirring for 30 min in a water bath at 80° C. to obtain a first mixed solution;

adding N,N'-(4,4'-methylenediphenyl)bismaleimide into the first mixed solution and stirring for 20-30 min in an oil bath at 130° C. to obtain a prepolymer;

pouring the prepolymer into a mold and subjecting to vacuum degassing for 30 min at 130° C.;

transferring the prepolymer into a drying oven for curing after vacuum degassing; and after curing, naturally cooling the prepolymer to obtain the flame-retardant bismaleimide resin;

wherein the temperature control in curing is as follows in sequence: firstly, the temperature is increased to be 150° C. for a first time, and the temperature is maintained for 2 h; then the temperature is increased to be 180° C. for a second time, and the temperature is maintained for 2 h; the temperature is increased to be 200° C. for a third time, and the temperature is maintained for 2 h; the temperature is increased to be 220° C. for a fourth time, and the temperature is maintained for 2 h; and finally, the temperature is increased to be 240° C. for a fifth time, and the temperature is maintained for 4 h, and wherein the mass ratio of 2,2'-diallyl bisphenol A to N,N'-(4,4'-methylenediphenyl)bismaleimide is 2:3.

* * * * *